Figure 1:
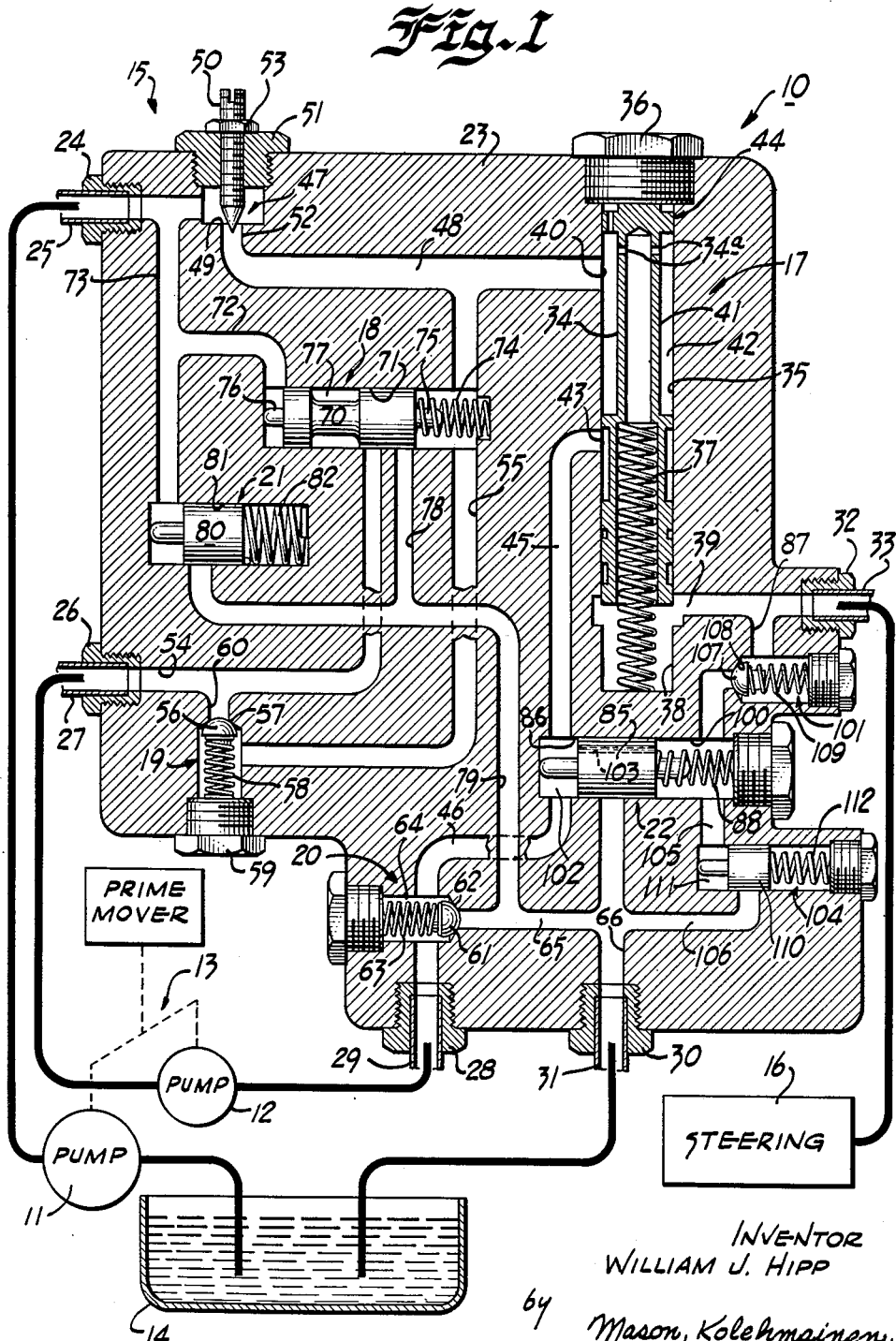

June 4, 1963

W. J. HIPP 3,091,929

REGENERATIVE HYDRAULIC CIRCUIT

Original Filed June 23, 1960

2 Sheets-Sheet 1

INVENTOR
WILLIAM J. HIPP

Mason, Kolehmainen,
Rathburn and Wyss
ATTORNEYS

June 4, 1963 W. J. HIPP 3,091,929
REGENERATIVE HYDRAULIC CIRCUIT
Original Filed June 23, 1960 2 Sheets-Sheet 2
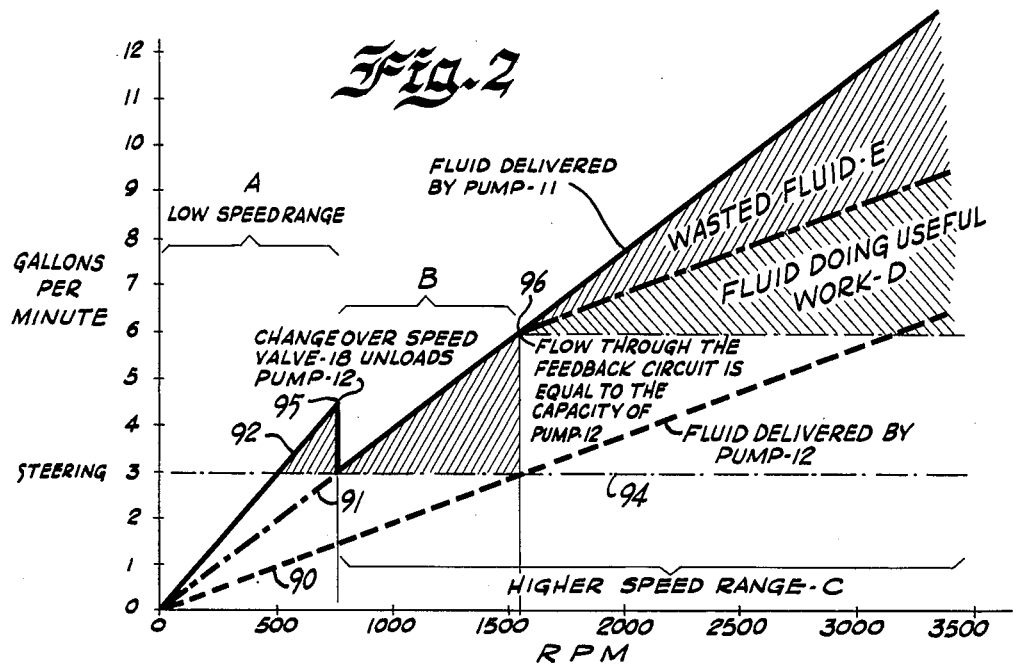
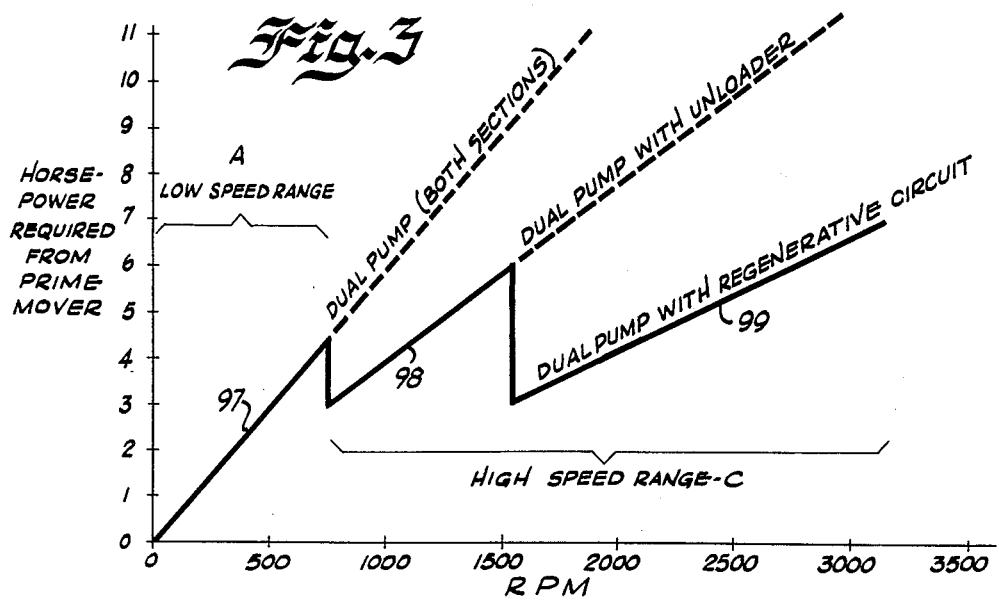
INVENTOR
WILLIAM J. HIPP
by
Mason, Kolehmainen, Rathburn and Wyss
ATTORNEYS.

United States Patent Office 3,091,929
Patented June 4, 1963

3,091,929
REGENERATIVE HYDRAULIC CIRCUIT
William J. Hipp, Mount Pleasant Township, Racine County, Wis., assignor to Webster Electric Company, Racine, Wis., a corporation of Delaware
Continuation of abandoned application Ser. No. 38,318, June 23, 1960. This application Oct. 16, 1961, Ser. No. 146,073
21 Claims. (Cl. 60—52)

The present invention relates generally to hydraulic systems and is especially well suited for use on a motor driven vehicle to provide fluid for power steering wherein a fixed volume of fluid is usually required regardless of the speed of the vehicle engine. The invention is more particularly concerned with a new and improved hydraulic circuit operable at normal engine running speeds to utilize the excess fluid not required by the steering circuit for assisting the prime mover or vehicle engine in order to reduce the power required from the prime mover. This application is a continuation of U.S. patent application Serial No. 38,318, filed June 23, 1960 and now abandoned.

While the hydraulic circuit of the present invention may be utilized in any system of the type supplying operating fluid to a priority circuit requiring a substantially constant volume of fluid, it is especially well suited, as was indicated above, for use in circuits for providing fluid for the power steering mechanism employed on a motor driven vehicle. In such systems, the power steering circuit must have priority over the other hydraulic circuits of the vehicle in order to provide the operator with continuous, uninterrupted control of the vehicle movement. The power steering circuit usually requires a fixed volume of fluid from relatively low engine idle speeds to full engine speed. One hydraulic system used in such circuits prior to the present invention employs a single pump and, as a consequence, the requirement of supplying constant volume over a very wide speed range is met only by providing a pump of sufficient capacity to supply the necessary volume of fluid at idle speed while the volume of oil delivered at high engine speeds greatly exceeds the system requirements. Therefore, these single pump systems employ an excessively large pump which requires an inordinate amount of power from the prime mover and, at the same time, the excessive fluid circulated at high engine speeds generates considerable heat which may require complex mechanisms for dissipation. Dual pump systems have been proposed which supply the output of both pumps to the hydraulic circuit at low speeds and which automatically unload one of the pumps when the speed reaches a predetermined value so that the load is supplied entirely by the remaining pump, but these systems nevertheless suffer from the same disadvantages as the single pump systems although to a somewhat lesser degree.

The present invention has for its primary object the provision of a new and improved hydraulic system requiring less power from the prime mover than systems of prior design.

Another object of the present invention is to provide a hydraulic system of the character indicated above but which avoids the continuous circulation of excess fluid, thus minimizing the heat generated.

A further object of the invention is to provide a hydraulic system of the character indicated which avoids the dumping or unloading of fluids at excessively high pressures.

The invention has for another and more specific object the provision of a hydraulic system wherein during certain conditions of operation the excess fluid not required by the primary or priority circuit is used to assist the prime mover in order to conserve power.

The foregoing and other objects are realized, in accordance with the present invention, by providing a hydraulic circuit including first and second pumps of different capacity for supplying fluid from a reservoir through a flow divider valve to a priority circuit such as the power steering of a motor driven vehicle. The two pumps are driven from the vehicle engine through a common drive mechanism and are so arranged that at engine idle speed, both pumps draw fluid from the reservoir and supply it to the inlet of the flow divider valve. The latter valve includes a first outlet port for supplying to the priority circuit a substantially constant volume of the fluid supplied to the inlet. To this end, the flow divider valve includes a piston mounted for sliding movement within a valve bore and biased toward one end of the bore by a spring. The piston is provided with one or more flow restricting orifices for continuously supplying fluid from the inlet to the first outlet. Flow of fluid through the piston orifices above the constant level required by the priority circuit creates a pressure drop across the piston which is effective to move the piston against the biasing spring thus diverting excess fluid from the inlet to a second outlet leading from the priority valve. The latter outlet is connected to supply fluid through a regenerative feedback circuit to the inlet side of the smaller capacity pump so that fluid flow through the feedback circuit at a rate in excess of the capacity of the latter pump drives this pump as a hydraulic motor. Since the low capacity pump is connected through the common drive mechanism to the high capacity pump, the excess fluid flowing through the feedback circuit at high engine speeds is utilized to perform work in driving the smaller capacity pump and, as a result, the power required from the prime mover to drive the higher capacity pump is reduced. The system further includes an unloading valve for connecting the outlet of the lower capacity pump to the reservoir when the fluid flow from the large pump exceeds the predetermined level required for priority circuit operation. To this end, the output of the high capacity pump is supplied to the inlet of the flow divider valve through a flow-restricting orifice the opposite sides of which are connected to the unloading valve so that the latter valve is operated in response to the pressure drop across the orifice. Whenever the flow through the latter orifice exceeds the predetermined level required for priority circuit operations, the unloading valve is moved to a position wherein it unloads the low capacity pump. A relief valve is provided for the outlet of the high capacity pump to prevent the development of excessive pressure. A safety relief valve connected to the two outlets from the flow divider valve controls the pressure of the fluid supplied via the regenerative feedback circuit to drive the low capacity pump. The latter relief valves and the unloading valve are automatically and continuously adjusted to the actual working pressure of the priority circuit, thus avoiding the bypass of fluid at excessive pressures.

The invention both as to its organization and manner of operation, together with further objects and advantages thereof, will best be understood by reference to the following description taken in conjunction with the accompanying drawings wherein:

FIG. 1 is a sectional view illustrating a valve mechanism characterized by the features of the present invention with the associated pump, fluid reservoir and priority circuit being indicated schematically and with all of the valve passages and bores being illustrated as though they lie in a common plane even though in actual practice it will be necessary to offset certain of these passages to provide the desired isolation;

FIG. 2 is a graph illustrating the fluid flow from the pumps employed in the system shown in FIG. 1 as a function of the speed of the prime mover; and FIG. 3 is a graph similar to FIG. 2 but illustrates the horsepower required from the prime mover as a function of prime mover speed.

Referring now to the drawings and first to FIG. 1, the hydraulic circuit of the present invention is there indicated generally by the reference numeral 10 and comprises first and second pumps 11 and 12 of different capacity with the pump 11 being of larger capacity than the pump 12. The pumps 11 and 12, which are of the positive displacement type, are driven from a common variable speed drive means, indicated generally by the reference numeral 13, with the latter means preferably including a prime mover. As was indicated previously, the hydraulic system 10 is especially well suited for use on motor driven vehicles and in such cases the prime mover for the drive means 13 will, of course, comprise the engine of the vehicle. The pumps 11 and 12 are adapted to deliver fluid such as oil from a tank or reservoir 14 through suitable control valving indicated generally by the reference numeral 15 to a priority circuit or fluid operated device 16 which, as was indicated previously, may comprise the power steering for the vehicle.

The control valving 15 includes a flow divider valve 17, an unloading valve 18, a pair of check valves 19 and 20, a pressure relief valve 21 and a safety relief valve 22. These valves may be separate units or, in the alternative, they may be mounted within a common valve housing or body as illustrated in FIG. 1. If a common valve body is used, the valves are connected through suitable passages in the body but in the event that the valves are separate units they will, of course, be interconnected in an identical manner by the use of conduits or pipes. In the ensuing description, it will be assumed that all of the valves are mounted within a common valve body 23 having a first inlet fitting 24 connected to an inlet pipe 25 leading to the outlet or pressure side of the large capacity pump 11 and also having a second inlet fitting 26 connected to a pipe or conduit 27 leading to the outlet or pressure side of the low capacity pump 12. The inlet or suction side of the large capacity pump 11 is connected directly to the tank or reservoir 14. The valve body 23 is further provided with a first outlet fitting 28 connected through a pipe or conduit 29 to the inlet side of the low capacity pump 12 and with a second outlet fitting 30 connected through a pipe or conduit 31 to the tank or reservoir 14. Fluid for the priority or steering circuit 16 is supplied through an outlet fitting 32 and through a pipe or conduit 33.

As was indicated previously, the control valving 15 is adapted to supply a substantially constant volume of fluid to the circuit 16 through a very wide speed range extending from the idling speed of the prime mover to full engine speed.

The fluid flow to the priority circuit 16 is maintained substantially constant by the flow divider valve 17. The latter valve is of conventional construction and includes a valve piston 34 mounted for sliding movement within a valve bore 35 formed in the valve body 23. The outer end of the latter bore is preferably closed by a plug 36 threaded into the valve body. The piston 34 is biased toward the plug 36 by means of a coil spring 37 mounted within a spring chamber 38 in the inner end of the bore 35. The spring chamber 38 is connected directly to a first outlet 39 from the flow divider valve and then to the outlet fitting 32. An inlet 40 opening to the valve bore 35 near the upper end thereof receives fluid from the pumps 11 and 12 for supply through the flow divider 17 to the circuit 16. To this end, the piston 34 preferably includes an enlarged annular groove 41 cooperating with the valve bore 35 to define an inlet chamber 42 communicating with the inlet 40. The piston 34 is further provided with one or more flow restricting openings 34a therein continuously connecting the inlet chamber 42 to the spring chamber 38 for the purpose of supplying a substantially constant volume of fluid to the outlet 39. The upper end of the piston 34 cooperates with the valve bore and the plug 36 to form a damping dashpot 44 for inhibiting oscillation of the piston in response to fluctuations in pressure. Since this damping dashpot is of conventional construction, it will not be described in detail.

A second outlet 43 from the flow divider valve communicates with the valve bore 35 at a point intermediate the inlet 40 and the first outlet 39. The piston 34 is so constructed and arranged that when it is in the position illustrated in FIG. 1 with its upper end biased into engagement with the plug 36, the outlet 43 is isolated from the inlet chamber 42. The fluid flow through the openings 34a to the outlet 39 is, of course, supplied to the priority circuit. When the flow through the openings 34a reaches the desired constant volume required by the priority circuit, the pressure drop across these openings becomes sufficient to move the piston 34 against the spring 37 and towards the inner end of the valve bore 35 until the inlet chamber 42 connects to the outlet 43 to divert the excess fluid from the inlet 40. The excess fluid from the flow divider valve diverted to the outlet 43 is passed to the inlet or suction side of the low capacity pump 12 via a regenerative feedback circuit which, in the form of the invention illustrated in FIG. 1, includes a passage 45, the safety relief valve 22, a passage 46, the outlet fitting 28, and the conduit 29. As will be described more fully hereinafter, the fluid supplied to the pump 12 via the regenerative feedback circuit just described is effective to drive the latter pump as a hydraulic motor as soon as the volume of fluid passing through this feedback circuit exceeds the capacity of the low capacity pump. Since the pump 12 is connected to the large capacity pump 11 through the common drive means 13, when the pump 12 is driven as a motor it supplies part of the power required for driving the large capacity pump, thereby to reduce the power required from the prime mover or the vehicle engine.

Fluid is supplied to the inlet 40 of the flow divider valve 17 from the large capacity pump 11 through a flow restricting orifice 47 and through a passage 48. The orifice 47 may be of fixed size but in the form shown in FIG. 1 it is illustrated as an adjustable orifice defined by an adjustable valve element or needle 50 extending into a central passage 52 formed in a shoulder 49. The needle includes a stem portion threaded into a central bore formed in a plug 51 secured to the valve body. The needle is provided with a conically shaped end portion which may be moved within the passage 52 to adjust the size of the orifice 47. A lock nut 53 is provided for locking the valve element 50 in its adjusted position.

Fluid from the low capacity pump 12 is supplied to the inlet 40 through the fitting 26, through a passage 54, through the check valve 19, and through a passage 55. The check valve 19 may be of any conventional construction but in the form illustrated it includes a poppet valve element 56 biased towards a tapered valve seat 57 by means of a coil spring 58 acting against a plug 59 threaded into the valve body 23. The valve seat 57 is connected to the passage 54 through a small connecting passage 60, while the spring chamber containing the coil spring 58 communicates directly with the passage 55.

The inlet side of the low capacity pump 12 is connected to the reservoir 14 through the check valve 20 which is similar in construction to the check valve 19 just described. Specifically, the valve 20 comprises a valve element 61 biased into engagement with a tapered valve seat 62 by means of a coil spring 63 seated within a spring chamber 64. The chamber 64 is directly connected to the passage 46 and to the outlet fitting 28 leading to the inlet side of the pump 12. The valve seat 62 is connected directly to the tank 14 through passages 65 and 66 and through the outlet fitting 30.

At low engine speeds, the volume of fluid delivered from each of the pumps 11 and 12 is relatively low and, under these conditions, the fluid from both pumps is supplied to the inlet 40 in order to meet the demands of the priority circuit. Specifically, fluid is supplied by the large capacity pump from the tank 14 through the orifice 47 to the inlet 40. At the same time, the suction at the inlet side of the pump 12 is effective to unseat the poppet valve element 61 in order to open the check valve 20 thus drawing fluid from the tank 14 through the passages 65 and 66. The pump 12 supplies fluid under pressure through the inlet fitting 26 to the check valve 19 to unseat the poppet valve 56 and, hence, to supply the inlet fluid through the passage 55 to the inlet 40. Thus, at low prime mover speeds the latter inlet is receiving fluid from both the pumps. At this time, the flow from the pump 11 is relatively low and, hence, a relatively small pressure difference is created on opposite sides of the flow restricting orifice 47.

As the speed of the prime mover increases, the volume of fluid delivered by the pumps 11 and 12 is also increased, thus increasing the flow through the orifice 47 to create a greater pressure drop thereacross. When the flow through the orifice 47 is sufficient to permit the large capacity pump 11 to supply all of the fluid required by the priority circuit 16, the unloader valve 18 functions automatically to unload the low capacity pump 12. To this end, the unloading valve 18 comprises a piston 70 mounted for sliding movement within a valve bore 71 which has its opposite ends respectively connected to the opposed sides of the orifice 47. More specifically, one end of the bore 71 is connected directly to the passage 55 which, in turn, communicates with the passage 48 at one side of the orifice 47 while the other end of the bore 71 is connected through passages 72 and 73 to the other side of the orifice 47. Thus, the piston 70 is subjected to the pressure drop existing across the orifice 47. The piston 70 is normally biased toward one end of the valve bore 71 by means of a coil spring 74 encircling a stop 75 extending axially from one end of the piston. A second stop 76 extending axially from the opposite end of the piston 70 limits the leftward movement of the latter piston as viewed in FIG. 1. The left face of the piston 70 as viewed in FIG. 1 is exposed to the pressure from the outlet side of the pump 11 while the right face of the piston is exposed to the pressure of the fluid at the inlet of the flow divider valve. When the pressure difference between these two fluid pressures becomes sufficient to overcome the spring 74, that is, when the prime mover reaches what will be termed hereinafter as the "changeover speed," the fluid flow through the orifice 47 exceeds a predetermined rate determined by the size of the orifice 47, the area of the piston 70, and the strength of the spring 74, the fluid forces acting on the piston 70 move this piston to the right against the action of the spring 74. The rightward movement of the piston 70 is limited by the stop 75. When the piston 70 is moved to the right, an annular groove 77 formed therein connects the passage 54 at the outlet side of the low capacity pump 12 to the tank 14 through a pair of passages 78 and 79, through the passages 65 and 66, and through the outlet fitting 30. Thus, when the valve piston 70 is moved to the right, the low capacity pump 12 is unloaded and the pressure of the fluid in the passage 54 drops to tank pressure. The low pressure fluid acting on the poppet valve element 56 becomes insufficient to resist the spring 58 and, as a consequence, the check valve 19 closes, thus interrupting the flow of fluid from the low capacity pump 12 to the inlet 40. At this point, the inlet 40 receives fluid only from the high capacity pump 11. Therefore, it will be observed that when the prime mover is operated through its relatively low speed range, up to the point where it reaches the changeover speed, the outputs from both the pumps 11 and 12 are supplied to the inlet 40 of the flow divider valve but when the speed of the prime mover reaches the changeover point, the unloader valve 18 automatically dumps or unloads the low capacity pump 12, thus supplying fluid to the flow divider valve inlet only from the high capacity pump 11.

As the speed of the prime mover continues to increase beyond the changeover point, the flow to the inlet 40 increases. This fluid passes through the openings 34a in the piston 34 to the outlet 39 leading to the priority circuit 16. When the flow rate through the opening 34a exceeds the desired constant level or volume required by the priority circuit 16, the piston 34 is automatically moved downwardly as viewed in FIG. 1 against the spring 37. The downward movement of the piston 34 connects the inlet 40 to the outlet 43, thus diverting the excess fluid not required by the priority circuit to the regenerative feedback circuit leading to the low capacity pump 12. As the speed of the prime mover continues to increase, the amount of fluid diverted through the passages 45 and 46 is correspondingly increased until the fluid flow to the pump 12 exceeds the capacity of the latter pump whereupon this pump is driven as a hydraulic motor. At this point, the pump 12 becomes effective through the common drive means 13 to supply a portion of the drive for the high capacity pump 11, thus reducing the power required from the prime mover.

The pressure relief valve 21 is effective to relieve any excess pressure at the outlet of the high capacity pump 11. This relief valve may take any conventional form but, as illustrated, it comprises a piston 80 mounted for sliding movement with a valve bore 81 and biased toward one end of the latter bore by means of a coil spring 82. The piston 81 is exposed on one face to the pressure of the fluid in the passage 73 which, of course, is connected directly to the outlet of the pump 11. In the event that the pressure of the fluid at the outlet of the latter pump becomes excessive, the piston 80 is moved to the right to connect the passage 73 to the passage 79 leading directly to the tank 14, thus relieving the excess pressure.

The pilot operated safety relief valve 22 controls the pressure of the fluid supplied via the regenerative feedback circuit to the inlet of the low capacity pump 12. This valve comprises a valve piston 85 mounted within a valve bore 86 and biased toward one end of the chamber by a very light spring 88. A chamber 100 at one end of the bore 86 receives fluid from the outlet 39 through a pair of connecting passages 87 and 89 and a check valve 101. A second chamber 102 formed at the other side of the piston 85 receives fluid from the outlet 43 through the passage 45. The chambers 100 and 102 are connected through an orifice 103 formed in the valve piston 85. The chamber 100 is also connected through a pilot relief valve 104 and through a pair of passages 105 and 106 to the bypass or exhaust passage 66. The check valve 101 may be of any conventional construction and includes a valve element 107 biased towards a valve seat 108 by a light spring 109. The pilot relief valve 104, on the other hand, includes a valve piston 110 biased towards one end of a valve bore 111 by means of a heavy spring 112.

Whenever the pressure of the fluid in line 45 exceeds that in the outlet passage 39 by a slight amount sufficient to overcome the very light spring 109, the check valve element 107 is moved from the seat 108 to permit fluid flow from the passage 45 to the line 39 through the orifice 103. This fluid flow causes a pressure drop across the orifice of sufficient value to overcome the spring 88 in order to move the piston 85 to the right as viewed in FIG. 1, thereby connecting the line 45 to the bypass line 66 and relieving the excess pressure. Thus, it will be apparent that the pressure of the fluid in the line 45 fluctuates in response to any change in pressure of the fluid in the outlet line 39 to the primary circuit. The spring 112 of the pilot relief valve 104 is selected to control the maximum pressure of the fluid in the system. Thus, in the event of excess pressure in the line 39, the pressure in the inlet chamber 42 also rises and the fluid flow through the orifice 103 is increased. The check valve 101 is closed because the pressure in the line 39 is slightly greater than that in the chamber 100. The increased flow through the orifice 103 moves piston 85 to the right to dump fluid to the passage 66 in order to prevent further buildup of pressure in the chamber 42 and the line 39. The excess flow through the orifice 103 moves the valve piston 110 to the right so that the fluid flow through the orifice 103 now passes through the valve 104 to the passage 66 instead of through the check valve 101. The valve 104, of course, relieves the excess pressure by connecting the chamber 100 to the exhaust or bypass line 66 while the check valve 101 functions to prevent flow from the outlet line 39 to the chamber 100 during the maximum pressure condition. Thus, it will be observed that both the relief valve 22 and the unloading valve 18 are automatically adjusted to the working pressure of the fluid supplied to the circuit 16 and, as a consequence, the relief and unloading pressures in the system are always in accord with the actual working pressure. Fluid is never dumped or bypassed at excessive pressures.

Turning now to the operation of the system shown in FIG. 1 and referring to FIGS. 2 and 3, it will be observed that in FIG. 2 the flow from the pumps 11 and 12 is plotted as a function of the speed of the prime mover. In FIG. 3, the horsepower required from the prime mover is plotted as a function of prime mover speed. Thus, as the vehicle is started from rest and as the prime mover begins to pick up speed through the low speed range indicated at A in FIGS. 2 and 3, the fluid flow from the pumps 11 and 12 increases linearly. Specifically, the fluid flow from the pump 12 is represented in FIG. 2 by the straight line 90 while the fluid flow from the pump 11 is represented by the straight line 91. The total fluid flow from both pumps is represented by the solid line 92. The constant fluid volume required by the priority circuit 16 is indicated by the horizontal straight line 94 in FIG. 2. Thus, it will be observed that the total flow from both pumps builds up to the desired constant level 94 very rapidly and within a few hundred r.p.m. after the initial start of the prime mover. The total flow continues to build up during the low speed range A until the prime mover reaches the changeover speed indicated at 95 on the curve shown in FIG. 2 whereupon the unloading valve 18 becomes effective in the manner described above to unload the pump 12. From this point on through the higher speeds of the prime mover, the total flow curve 92 coincides with the line 91 representing the output of the pump 11. This is, of course, due to the fact that the high capacity pump 11 supplies all of the fluid to the flow divider valve 17. The cross hatched portions lying between the straight line 94 and the total flow 92 in the low speed range A and in the speed range B represent fluid which is being diverted by the flow divider valve 17 through the outlet 43 but which performs no useful work. When the speed of the prime mover reaches the point indicated at 96, the flow from the outlet 43 through the regenerative feedback circuit becomes equal to the capacity of the low capacity pump 12 and, hence, for all speeds above the point 96, the pump 12 is being driven as a hydraulic motor. A portion of the fluid flowing through the feedback circuit is thus performing useful work in driving the pump 12. The portion of the fluid doing useful work is represented by the cross hatched portion D indicated in FIG. 2 while that portion of the fluid flow which is doing no useful work is represented by the cross hatched portion E.

The curve illustrated in FIG. 3 shows that the horsepower required from the prime mover increases linearly with speed through the low speed range A. The horsepower required drops off at the changeover speed when the prime mover is no longer required to supply power for driving the low capacity pump 12. The power required to drive the higher capacity pump 11 from the changeover speed through the high speed range C then gradually increases as indicated by the straight line 98 until a point is reached where the low capacity pump 12 begins to perform useful work. From this point on, the horsepower required from the prime mover gradually increases with speed through the speeds represented by the straight line 99.

In view of the foregoing description, it will be observed that the embodiment of the invention illustrated in FIG. 1 is effective to accomplish all of the enumerated objects and advantages. While the invention has been described in conjunction with an illustrative embodiment, it will be understood that many modifications will readily occur to those skilled in this art and it is, therefore, contemplated by the appended claims to cover any such modification as falls within the true spirit and scope of the invention.

What is claimed as new and desired to be secured by Letters Patent of the United States is:

1. In a hydraulic system for supplying a predetermined, substantially constant volume of fluid to a fluid operated device the combination of first and second pumps of different capacity with the first pump having a larger capacity than the second pump; means providing a common drive for said first and second pumps; a flow dividing valve having an inlet, a first outlet connected to supply fluid from said inlet to said fluid operated device and a second outlet connected to supply fluid from the inlet to the inlet side of said second pump; a fluid reservoir connected to the inlet side of said second pump; means including a flow restricting orifice for connecting the outlet side of said first pump to deliver fluid to said inlet; means including a first check valve connecting the reservoir to the inlet side of said second pump; means including a second check valve for connecting the outlet side of said second pump to said inlet; an unloading valve connected to the outlet of said first pump and to the inlet of said flow dividing valve, and having a valve element movable from a first position to a second position in response to a pressure drop across said orifice above a predetermined value, said unloading valve being effective in said second position to connect the outlet side of said second pump to said reservoir, said unloading valve being effective in said first position to interrupt the connection between said reservoir and the outlet side of said second pump, whereby both of said pumps are effective to supply fluid to said inlet until the flow through said orifice from said first pump reaches a level sufficient to create a pressure drop of said predetermined value, whereupon said valve element is moved to said second position to unload said second pump; said flow dividing valve being constructed and arranged to divert excess fluid flow from said inlet above said predetermined, substantially constant volume to said second outlet so that said excess fluid flow drives said second pump as a motor whenever said excess fluid flow exceeds the capacity of said second pump, thereby to drive said first pump through said common drive means.

2. The apparatus defined by claim 1 which further includes a pressure relief valve connected between the reservoir and the outlet side of the first pump and a safety relief valve connected to said first and second outlets and having a valve element therein movable from a first position to a second position in the event that the pressure of the fluid supplied to said second outlet exceeds that supplied to the first outlet by a preselected amount, said safety relief valve being effective when its valve element is in its second position to bypass excess fluid from said second outlet to said reservoir.

3. The apparatus defined by claim 1 wherein the flow dividing valve comprises a valve piston mounted for sliding movement within a valve bore and biased towards one end of the valve bore by a spring, said inlet being connected to said bore near said one end, said first outlet being connected to said valve bore near the end opposite said one end, said second outlet being connected to said valve bore intermediate said inlet and said first outlet, said piston being provided with means defining at least one continuously open, flow restricting opening providing a continuous fluid connection between said inlet and said first outlet, said piston being constructed and arranged to normally prevent fluid flow from the inlet to the second outlet but being movable against said spring in response to the pressure drop across said opening caused by fluid flow therethrough at a rate in excess of said predetermined volume, thereby to move said piston to a position wherein it connects said inlet to said second outlet.

4. In a hydraulic system for supplying fluid to a fluid operated device the combination of first and second pumps; means including a prime mover for providing a common drive for said first and second pumps; a flow dividing valve having an inlet, a first outlet connected to supply fluid from said inlet to said fluid operated device and a second outlet connected to supply fluid from the inlet to the inlet side of said second pump; a fluid reservoir connected to the inlet side of said second pump; means including a flow restricting orifice for connecting the outlet side of said first pump to deliver fluid to said inlet; means including a first check valve connecting the reservoir to the inlet side of said second pump; means including a second check valve for connecting the outlet side of said second pump to said inlet; an unloading valve in fluid communication with the outlet of the first pump and with the inlet of the flow dividing valve and having a valve element movable from a first position to a second position in response to a pressure drop across said orifice above a predetermined value, said unloading valve being effective in said second position to connect the outlet side of said second pump to said reservoir, said unloading valve being effective in said first position to interrupt the connection between said reservoir and the outlet side of said second pump, whereby both of said pumps are effective to supply fluid to said inlet until the flow through said orifice from said first pump reaches a preselected level sufficient to create a pressure drop of said predetermined value, whereupon said valve element is moved to said second position to unload said second pump, said flow dividing valve being constructed and arranged to divert excess fluid flow to said second outlet so that said excess fluid flow drives said second pump as a motor whenever its rate of flow exceeds the capacity of the second pump, thereby to drive said first pump through said common drive means and to reduce the power required from said prime mover.

5. The apparatus defined by claim 4 which further includes a pressure relief valve connected between the reservoir and the outlet side of the first pump and a safety relief valve connected to said first and second outlets and having a valve element therein movable from a first position to a second position in the event that the pressure of the fluid supplied to said second outlet exceeds that supplied to the first outlet by a preselected amount, said safety relief valve being effective when its valve element is in its second position to bypass excess fluid from said second outlet to said reservoir.

6. The apparatus defined by claim 4 wherein the flow dividing valve comprises a valve piston mounted for sliding movement within a valve bore and biased towards one end of the valve bore by a spring, said inlet being connected to said bore near said one end, said first outlet being connected to said valve bore near the end opposite said one end, said second outlet being connected to said valve bore intermediate said inlet and said first outlet, said piston being provided with means defining at least one continuously open flow restricting opening providing a continuous fluid connection between said inlet and said first outlet, said piston being constructed and arranged to normally prevent fluid flow from the inlet to the second outlet but being movable against said spring in response to the pressure drop across said opening caused by fluid flow therethrough, thereby to move said piston to a position wherein it connects said inlet to said second outlet.

7. In a hydraulic system for supplying fluid to a fluid operated device the combination of first and second pumps; means providing a common drive for said first and second pumps; a flow dividing valve having an inlet, a first outlet connected to supply fluid from said inlet to said fluid operated device and a second outlet connected to supply fluid from the inlet to the inlet side of said second pump; means including a flow restricting orifice for connecting the outlet side of said first pump to deliver fluid to said inlet; means including a check valve for connecting the outlet side of said second pump to said inlet; an unloading valve connected to said inlet and to the outlet of said first pump and having a valve element movable from a first position to a second position in response to a pressure drop across said orifice above a predetermined value, said unloading valve being effective in said second position to unload said second pump, whereby both of said pumps are effective to supply fluid to said inlet until the flow through said orifice from said first pump reaches a preselected level sufficient to create a pressure drop of said predetermined value, whereupon said valve element is moved to said second position to unload said second pump, said flow divider valve being constructed and arranged to divert excess fluid flow not required by the fluid operated device to said second outlet so that said excess fluid flow drives said second pump as a motor whenever the excess flow exceeds the capacity of the second pump, thereby permitting the second pump to supply a portion of the drive for said first pump through said common drive means.

8. The apparatus defined by claim 7 which further includes a pressure relief valve connected to the outlet side of the first pump to the relieve excess pressure and a safety relief valve connected to said first and second outlets and having a valve element therein movable from a first position to a second position in the event that the pressure of the fluid supplied to said second outlet exceeds that supplied to the first outlet, said safety relief valve being effective when its valve element is in said second position to bypass excess fluid from said second outlet.

9. The apparatus defined by claim 7 wherein the flow divider valve comprises a valve piston mounted for sliding movement within a valve bore and biased towards one end of the valve bore by a spring, said inlet being connected to said bore near said one end, said first outlet being connected to said valve bore near the end opposite said one end, said second outlet being connected to said valve bore intermediate said inlet and said first outlet, said piston being provided with means defining at least one continuously open flow restricting opening providing a continuous fluid connection between said inlet and said first outlet, said piston being constructed and arranged to normally prevent fluid flow from the inlet to the second outlet but being movable against said spring to a position wherein it connects said inlet to said second outlet, said piston being moved in response to the pressure drop across said opening caused by fluid flow therethrough.

10. In a hydraulic system for supplying a predetermined, substantially constant volume of fluid to a fluid operated device the combination of first and second pumps of different capacity with the first pump having a larger capacity than the second pump; means providing a common drive for said first and second pumps; a flow dividing valve having an inlet, a first outlet connected to supply fluid from said inlet to said fluid operated device and a second outlet connected to supply fluid from the inlet to the inlet side of said second pump; means including a flow restricting orifice for connecting the outlet side of said first pump to deliver fluid to said inlet; means including a check valve for connecting the outlet side of said second pump to said inlet; an unloading valve having a valve element movable from a first position to a second position in response to a pressure drop across said orifice above a predetermined value, said unloading valve being effective in said second position to unload said second pump, whereby both of said pumps are effective to supply fluid to said inlet until the flow through said orifice from said first pump reaches a preselected level sufficient to create a pressure drop of said predetermined value, whereupon said valve element is moved to said second position to unload said second pump, said flow divider valve being constructed and arranged to divert excess fluid flow not required by the fluid operated device to said second outlet so that said excess fluid flow drives said second pump as a motor whenever the excess flow exceeds the capacity of the second pump, thereby permitting the second pump to supply a portion of the drive for said first pump through said common drive means.

11. The apparatus defined by claim 10 which further includes a pressure relief valve connected to the outlet side of the first pump for relieving excess pressure and a safety relief valve connected to said first and second outlets and having a valve element therein movable from a first position to a second position in the event that the pressure of the fluid supplied to said second outlet exceeds that supplied to the first outlet beyond a preselected amount, said safety relief valve being effective when its valve element is in said second position to bypass excess fluid from said second outlet.

12. In a hydraulic system for supplying fluid from a fluid reservoir to a fluid operated device, the combination of first and second pumps; means providing a common drive for said first and second pumps; said common drive means including a prime mover operated through relatively low and relatively high ranges of speeds; valve means for controlling fluid flow from said pumps to said fluid operated device, said valve means being effective when said prime mover is operated through the relatively low speed range to supply the outputs of both of said pumps to said fluid operated device and being effective when said prime mover is operated through the relatively high speed range to unload the first pump to the reservoir and to supply fluid to said fluid operated device only from the second pump; passage means from said valve means connected to the inlet of the first pump independently of the reservoir, said valve means including means effective when the prime mover is operated in the relatively high speed range to divert to said passage excess fluid not required by said fluid operated device so that said excess fluid drives said first pump as a motor whenever the excess fluid flow exceeds the capacity of said first pump, thereby to drive said second pump through said common drive means and to reduce the power required from the prime mover.

13. In a hydraulic system for supplying fluid from a fluid reservoir to a fluid operated device, the combination of first and second pumps; means providing a common drive for said first and second pumps; said common drive means including a prime mover; valve means for supplying fluid from said pumps to said fluid operated device; passage means from said valve means connected to the inlet of the first pump independently of the reservoir, and said valve means including means for bypassing to said passage excess fluid not required by said fluid operated device so that said excess fluid drives said first pump as a motor whenever the excess fluid flow exceeds the capacity of said first pump, thereby to drive said second pump through said common drive means and to reduce the power required from said prime mover.

14. In a hydraulic system for supplying fluid from a fluid reservoir to a fluid operated device, the combination of first and second pumps; means providing a common drive for said first and second pumps; valve means for supplying fluid from said pumps to said fluid operated device; passage means from said valve means connected to the inlet of the first pump independently of the reservoir; and said valve means including means for bypassing to said passage excess fluid not required by said fluid operated device so that said excess fluid drives said first pump as a motor whenever the excess fluid flow exceeds the capacity of said first pump, thereby to drive said second pump through said common drive means.

15. In a hydraulic system for supplying a preselected volume of fluid from a fluid reservoir to a fluid operated device, the combination of first and second pumps of different capacity with the first pump having a capacity greater than the second pump; means including a prime mover for providing a common drive for said first and second pumps; valve means for supplying fluid from said pumps to said fluid operated device; passage means from said valve means connected to the inlet of the second pump independently of the reservoir; and said valve means including means for bypassing to said passage excess fluid above said preselected volume so that said excess fluid drives said second pump as a motor whenever the excess fluid flow exceeds the capacity of said second pump, thereby to supply a portion of the drive for said first pump through said common drive means and, hence, to reduce the power required from said prime mover.

16. In a hydraulic system for supplying a preselected volume of fluid from a fluid reservoir to a fluid operated device, the combination of first and second pumps of different capacity with the first pump having a greater capacity than the second pump; means including a prime mover operated through relatively low and high ranges of speed for providing a common drive for said first and second pumps; valve means for supplying fluid from said pumps to said fluid operated device, said valve means being effective when said prime mover is operated through the relatively low speed range to supply the outputs of both of said pumps to said fluid operated device and being effective when said prime mover is operated through the relatively high speed range to unload the first pump and to supply fluid to said fluid operated device only from the second pump; passage means from said valve means connected to the inlet of the second pump independently of the reservoir; said valve means including means effective when the prime mover is operated in the relatively high speed range to divert to said passage excess fluid above said preselected volume so that said excess fluid drives said second pump as a motor whenever the excess fluid flow exceeds the capacity of said second pump, thereby to supply a portion of the drive for said first pump through said common drive means and, hence, to reduce the power required from said prime mover.

17. In a hydraulic system for supplying fluid from a reservoir to a fluid operated device the combination of first and second pumps for drawing fluid from the reservoir; means providing a common drive for said first and second pumps; valve means for supplying fluid delivered from said pumps to said fluid operated device and including means for bypassing to the inlet of said first pump excess fluid under pressure not required by said fluid operated device via a path independent of said reservoir so that said excess fluid drives said first pump as a motor whenever the excess fluid flow exceeds the capacity of said first pump, thereby to drive said second pump through said common drive means.

18. In a hydraulic system for supplying a preselected volume of fluid from a reservoir to a fluid operated device the combination of first and second pumps of different capacity with the first pump having a capacity greater than the second pump; means including a prime mover for providing a common drive for said first and second pumps; valve means for supplying fluid delivered by said pumps to said fluid operated device and including means for bypassing to the inlet of said second pump excess fluid above said preselected volume via a path independent of said reservoir, said excess fluid having a pressure above that of the fluid in the reservoir to drive said second pump as a motor in order to supply a portion of the drive for said first pump through said common drive means and, hence, to reduce the power required from said prime mover.

19. Apparatus according to claim 18 wherein the first pump has a lower capacity than the second pump and wherein the first pump is driven as a motor whenever the excess flow delivered to its inlet via said path exceeds its relatively low capacity.

20. In a hydraulic system for supplying fluid to a fluid operated device, two positive displacement pumps, means including a common variable speed prime mover driving both of said pumps, and control valving connected to both pumps to receive output fluid therefrom, said control valving including means normally effective below a preselected speed of said prime mover to deliver the outputs of both pumps to said fluid operated device and further including means automatically operative above a predetermined speed of said prime mover for discontinuing the pumping function of one pump and for using excess fluid from the other pump to cause said one pump to operate as a fluid motor, thus assisting the prime mover in driving said other pump.

21. In a hydraulic system for supplying fluid to a fluid operated device, two positive displacement pumps, means including a common prime mover for driving both of said pumps, and control valving connected to both pumps to receive the outputs therefrom, said control valving including means normally effective to supply the outputs of both pumps to said fluid operated device and automatically effective when one of said pumps supplies sufficient fluid to satisfy the requirements of said device to supply a portion of the flow from said one pump to the other pump to drive the latter pump as a motor, thereby to assist the prime mover in driving said one pump.

References Cited in the file of this patent
UNITED STATES PATENTS

| | | |
|---|---|---|
| 2,618,932 | Taup | Nov. 25, 1952 |
| 2,905,191 | Vander Kaay | Sept. 22, 1959 |
| 2,988,889 | Bookout et al. | June 20, 1961 |
| 3,023,579 | Bookout et al. | Mar. 6, 1962 |
| 3,038,312 | Marsh | June 12, 1962 |